United States Patent [19]

Konen, Sr.

[11] 4,201,367
[45] May 6, 1980

[54] CHAIN STRETCHER APPARATUS

[76] Inventor: Jerome P. Konen, Sr., 3037 E. Somers Ave., Cudahy, Wis. 53110

[21] Appl. No.: 968,117

[22] Filed: Dec. 11, 1978

[51] Int. Cl.² .............................................. B66F 3/10
[52] U.S. Cl. ...................................................... 254/67
[58] Field of Search ..................... 254/67; 29/256, 257

[56] References Cited

U.S. PATENT DOCUMENTS

| | | | |
|---|---|---|---|
| 837,577 | 12/1906 | Loud | 29/257 |
| 1,555,471 | 9/1925 | Loker | 254/67 |
| 3,002,726 | 10/1961 | Ford | 254/67 |
| 4,131,264 | 12/1978 | Patterson et al. | 254/67 |

*Primary Examiner*—Robert C. Watson

*Attorney, Agent, or Firm*—Andrus, Sceales, Starke & Sawall

[57] ABSTRACT

A chain stretching tool includes a generally tubular support in which at least one moveable pin-like element is supported by a piston for axial movement relative to another fixed pin-like element. The member is spring-loaded to an expanded position. A threaded bolt or other similar member is mounted in the end of the housing and is adapted to force the pin-like element to move inwardly towards the opposite element. In use, the expanded elements engage the chain links. The bolt member is then threaded into the housing and simultaneously pulls the opposite ends of the chains towards each other for appropriate chain repair and the like.

7 Claims, 5 Drawing Figures

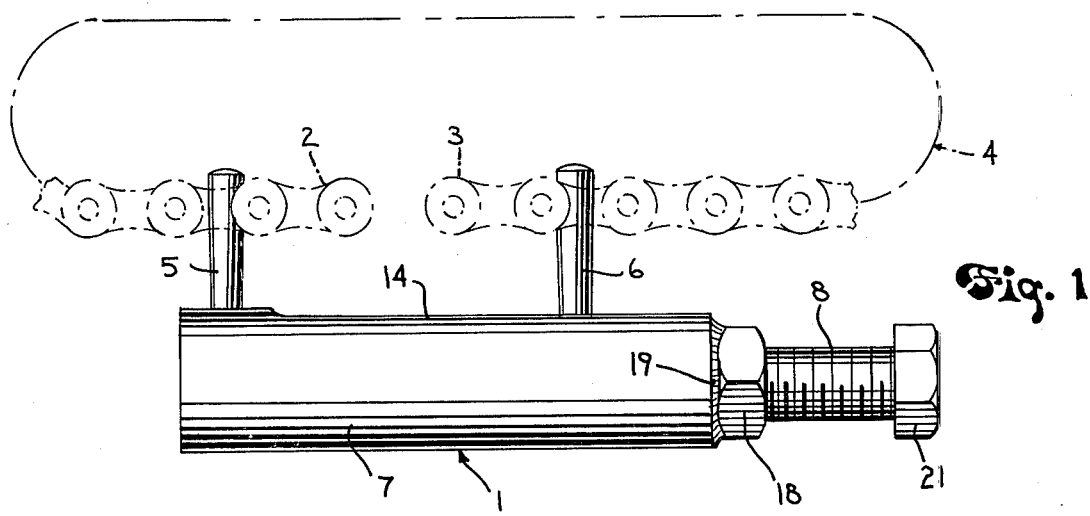
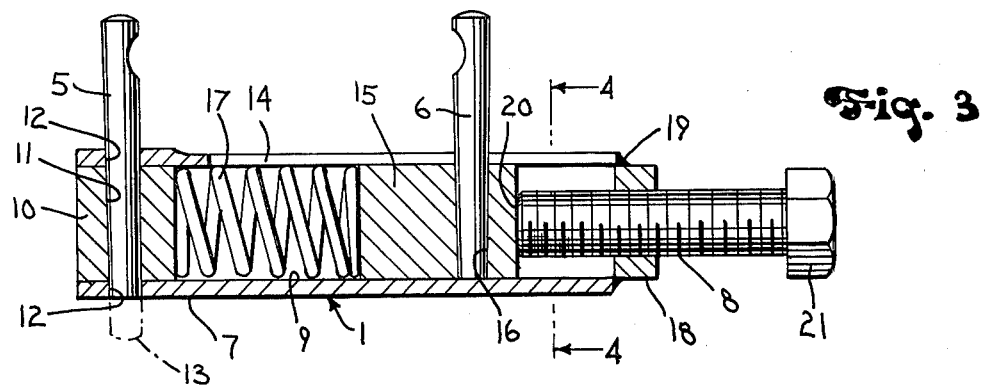
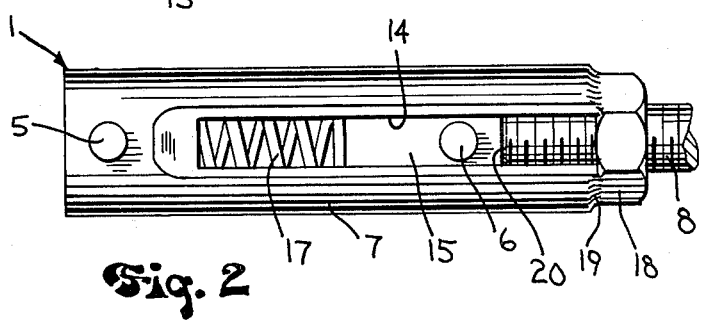
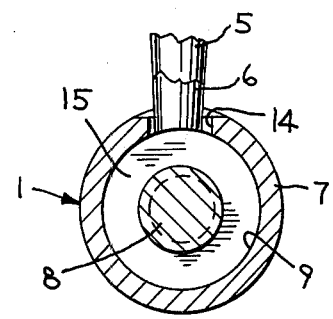
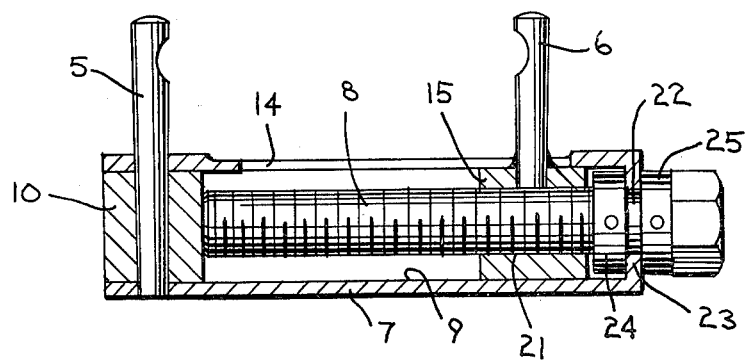

CHAIN STRETCHER APPARATUS

BACKGROUND OF THE INVENTION

Various manually operated devices have been suggested for holding of the opposite ends of an elongated chain unit during link replacement, servicing and the like. Multiple part vice-like members have been suggested, for example, as shown in U.S. Pat. No. 3,901,476, wherein a pair of elongated jaw members are pivotally interconnected to a common support. An appropriate expansion mechanism includes a rotating threaded shaft member mounted through similar followers for pivoting the jaw members and thereby expanding and retracting one member relative to the other. A somewhat similar device is also shown in U.S. Pat. No. 3,999,738. In addition to such pivotally mounted devices various threaded members provided with interconnecting jaw members have been suggested. For example U.S. Pat. No. 1,373,230 to S. H. Gainor discloses a drive-chain clamp arrangement wherein an L-shaped bolt is journaled in a support having an opposing jaw whereby the movement of a nut on the bolt causes retraction to close the jaw members for drawing of a chain together. A similar chain clamp with a somewhat more complex jaw mounting arrangement is shown in U.S. Pat. No. 752,074. A further threaded bolt-type unit wherein both of the jaw members are carried to the opposite sides of a rotating threaded shaft is shown in U.S. Pat. No. 762,060. A similar L-shaped chain tightener is also shown in U.S. Pat. No. 775,355 which issued Nov. 2, 1904. Although such devices may well provide a means for holding of the opposite ends of a chain for servicing or the like, they have various disadvantages as far as requiring special constructed parts, pivot connections and the like all of which provide a relatively expensive and complex construction. The Gainor patent would appear to provide a somewhat simpler and less complex and less expensive structure. However, its approach and concept would appear to have certain disadvantages, particularly from the standpoint of life and efficiency of operation. For example, moving of a threaded member through the journal portion of the support with the end extending substantially therefrom would tend to create interference between the bolt member and the support. This could create a drag and/or wear on the threads and/or the base support within which the bolt is moving. With the threaded construction, such interference could result in a very rapid wear of the threads or base member as well as contribute to an inefficient mechanical movement. Further, with the structure as illustrated, a relatively special tubing and housing construction is required, with a relatively heavy base support member having a first bore within which the support rod is located and a second enlarged bore within which the L-shaped end of the rod member can move. Although this should not effect the operability or efficiency of the device, it may well contribute to the cost of the device.

Thus, although there has been many suggestions and variations in chain coupling devices, they have certain distinct disadvantages from the standpoint of either cost, complexity, operation and the like.

Further, many of the prior art devices are not conveniently used in chain applications which have very limited space within which to operate. Thus in many applications, the chain will be confined within a housing-typed structure and access for servicing the chain and the like may be extremely restricted. In such cases many of the prior art devices would of course be completely inoperable because of the limited areas within which to operate. Although, some such as the Gainor patent, could perhaps be in such a location, they have certain other disadvantages.

Thus, although various prior art device have been suggested, all such devices are believed to suffer from certain practical considerations such as cost, complexity, life, use and the like.

SUMMARY OF THE PRESENT INVENTION

The present invention is particularly directed to the provision of a relatively compact and efficient chain stretcher which may be formed for use in very restricted environments or locations. Generally in accordance with the teaching of the present invention, the chain stretcher includes an outer generally tubular housing or support means having and outer longitudinal or axial slot. A piston means is located withing the support means and includes a jaw member extending outwardly through the slot for movement axially of the housing. The jaw member is moveable with respect to a second jaw member which can be fixed, moveable or adjustably positioned by an suitable means. A power positioning means includes a lever member which is moveably mounted to the housing and is coupled to the moving piston member for selected positioning thereof, thereby locating of the two jaw members relative to each other.

In a particularly practical embodiment of the present invention, the chain stretcher includes outer tubular housing formed of a conventional metal tubing or the like. One end is closed by a metal plug which is held in place by a tapered jaw pin which projects through the housing in the plug. The end of the pin projects outwardly to form the jaw of the chain stretcher. A coil spring member or the like is located within the housing. A piston member in a form of a cylindrical metal slug or block is journaled in the housing and is provided with a similar pin-like member which projects outwardly through the slot. The second member thus provides an opposing jaw to that of the fixed jaw. The opposite end of the tube member is provided with a threaded nut. A bolt member is threaded through the nut into bearing engagement with the center portion of the piston block and transmits the levered force at the bolt for positioning of the moveable chain stretcher pin relative to the fixed pin. The piston member is substantially larger in diameter than the bolt and takes up the forces transmitted from the chain.

In construction, the tapered pins are driven into the respective blocks and housing to provide a firm rigid interconnection. Any portion extending outwardly through the opposite inoperative end of the blocks can be readily moved by cutting, grinding, or the like.

The particular embodiment provides a simple construction employing readily available and standard-type components. It thus permits a very low cost construction. The guided piston movement within the housing provides movement which can be readily constructed with a minimum friction and interference in operation; thus providing a simple, low-cost and efficient chain stretcher unit.

The present invention thus provides a distinct improvement over any and all of the teachings of the prior art devices related to changed structure.

BRIEF DESCRIPTION OF DRAWING

The drawing furnished herewith illustrates a preferred construction of the present invention in which the above advantages and features are clearly disclosed as well as others which will be readily understood from the following description.

In the drawing:

FIG. 1 is a side elevational view of chain stretchers applied to a chain structure with the jaws partially separated;

FIG. 2 is a elevational view of a chain structure showin in FIG. 1;

FIG. 3 is a vertical section taken generally on line 3—3 of FIG. 2 and more clearly showing the internal components of the device illustrated embodiment;

FIG. 4 is a vertical section taken generally on line 4—4 of FIG. 3;

FIG. 5 is a vertical section of an alternate construction in accordance with the teaching of the present invention.

DESCRIPTION OF THE ILLUSTRATED EMBODIMENTS

Referring to the drawings and particularly to FIG. 1, a chain stretcher 1 illustrating an embodiment of the invention is shown coupled to the opposite free ends 2 and 3 of a chain 4. The stretcher 1 is adapted to draw the chain ends 2 and 3 towards each other for the purposes of properly locating them for the convenient insertion and completion of a connecting link into the chain. Thus, a chain 4 will normally be located in operative position and it is difficult to manually located the ends of the chain in position without the assistance of a suitable tool.

In the illustrated embodiment of the invention, the chain stretcher 1 includes a pair of pin-like chain jaws 5 and 6. Pin 5 is mounted in relatively fixed relationship to a housing 7 while the opposite pin 6 is moveable within the housing 7 under the rotation of a threaded bolt 8. This structure provides a simple, compact unit which can be readily located with the pins in engagement with the opposite end links 2 and 3 of the chain 4. With the pins 5 and 6 separated substantially, they are located for ready engagement with the links even though the chain is not in its operative condition or positions. The bolt 8 is then threaded into the unit, moving the moveable pin 6 towards the fixed pin 5 and thereby stretching the chain and pulling the two chain ends together.

More particularly in the embodiment of the invention illustrated in FIGS. 1-3, the housing 7 is formed of a simple tubular member having a relatively smooth inner bore 9. The fixed pin 5 is staked in the one end of the tube 7. In the illustrated embodiment of the invention, that end of the tube housing 7 is also closed by a suitable plug member or block 10 formed of a suitable material, such as metal. In assembly, the plug 10 is formed with a diameter essentially corresponding to that diameter of the tubing 7. Plug 10 has an opening 11 which when located within the tube housing 7 is aligned with a corresponding through opening 12 in the tubing. The fixed pin 5 is formed as a tapered pin which is driven into the aligned openings 11 and 12 of the block and the tubing to simultaneously locate and support the pin 5 within the end of the housing in a firm, strong construction. Any portion of the pin 5 which projects outwardly of the tubing, as shown for example in phantom at 13 in FIG. 3, can be readily removed by grinding, cutting or the like.

The tube housing 7 further includes a longitudinally or axially extending slot 14 which extends from the closed end essentially to the opposite end of the tubing. The slot 14 may be readily formed by a simple milling or cutting operation or the like.

The moveable pin 6 is secured within a cylindrical solid block-like piston 15 formed of a suitable metal or any other suitable strength material. The piston 15 has an outer diameter complementing the inner diameter of the tubing to create a smooth guided movement of the piston within the tube. The pin 6 may be staked in an opening 16 in the one end of the piston as shown using the same assembly process as that of staking the fixed pin 5. Thus, pin 6 may be driven into the piston and any extension removed by grinding or the like.

The piston 15 is journaled within the tubing for guided sliding movement. In the illustrated embodiment of the invention, coil spring 17 is located between the end plug 10 and the piston 15 to continuously and resiliently urge the piston 15 toward the open end of the tubing 7 to spread the pins 5 to 6 in the opposite directions.

The opposite end of the tube housing 7 is closed by a threaded nut member 18 which may be separately formed and welded as at 19 or otherwise fixedly secured to the end of the tube. Nut 18 has a threaded opening of a diameter slightly less than that of the internal diameter of the housing 7. Bolt member 8 is threaded through the nut 18, with the innermost end 20 located in bearing engagement against the outer face of the piston 15. The bolt 8 is located directly on the center of the piston and thus provides a direct in-line force and movement on the piston. The outer end of the bolt 8 is provided with the usual bolt head 21 in accordance with the conventional construction. The bolt head, with a suitable accompanying wrench, not shown, provides a high leverage operation permitting the chain stretcher to be readily applied in various high tension applications. The piston 15 provides a realtively large diameter member which is guided within the tube and readily accommodates any turning forces created by the chain on the pin and piston without undue interference with the movement. Threading of the bolt 8 into the nut 18 forces the inner end 20 within the housing 7 and the piston with moveable pin 6 slides the fixed pin 5, thereby reducing the space or gap between them. The piston 15 which closely but slidably fit within the tubular housing 7 provides a smooth bearing support for the moveable pin 6.

The projecting pins 5 and 6 with the straight line movement permits operation over a significant range of different sized chains in a single construction, and a small number of different tools can readily be provided for a wide range of chains.

With the illustrated embodiment of the invention, the bolt 8 operates on the piston 15 and thus pushes the one pin 6 toward the opposite pin 5 with a highly efficient mechanical motion. Further the chain stretcher can be formed as a relatively small tool. Thus, a practical device has been formed with a soft metal tubing four inches long and of diameter of less than one inch, while maintaining the necessary strength and efficiency to insure a high quality chain stretcher. The compactness of the tool makes is particularly applicable to chains in relatively confined locations. With all of these advantages, however, the tool can be readily formed from readily available components such as tubing, cylindrical blocks, rods, bolts and the like. Thus, it readily sdapts itself to commercial application and production.

Although shown in a highly practical and preferred embodiment, variations may readily be applied within the concepts and teaching of the present invention. For example, in FIG. 5 a similar chain stretcher is illustrated. In the embodiment of FIGS. 1 and 4, like members are given the corresponding members for purposes of clarity of explanation.

In the embodiment of FIG. 4, the bolt member 8 is threaded through the piston 15 carrying the moveable pin 6, as at 21. The bolt 8 is formed with a bearing shank 22 aligned with an end wall 23 of the housing 7. Collars 24 and 25 are firmly secured to bolt 8 the adjacent opposite sides of the wall 23. The collars 24 and 25 permit rotation of the bolt 8 but prevent axial movement thereof. The piston 15 which is threaded onto the bolt 8 therefore acts as a conventional follower, such that rotation of the bolt 8 results in the guided, slided movement of the piston 15 and the interconnected moveable pin 6. This, of course, results in directed mounting and interaction of the threaded member attached to the moveable pin which in turn may permit some interference between the piston and housing. Although such a construction can be employed to provide a very compact and effective tool, generally within the broad concepts of the present invention, the construction does not include the most significant concepts and teaching of the present invention and is considered inferior to the structure embodiment of the invention shown in FIGS. 1-3.

The present invention thus provides a strong, compact chain stretcher which can be constructed with practical production processing. The resulting tool provides not only a strong tool but a very efficient and long-life tool with a minimum amount of wear and the like.

I claim:

1. A chain stretcher apparatus for positioning the opposed ends of a roller-type link chain and the like in a machine, comprising an outer housing having an inner guide bore and longitudinal opening, a piston member slidably journaled within said bore for smooth guided sliding movement therein, resilient means urging the piston to one end of the bore of the housing, a first pin-like jaw secured to the piston member and projecting therefrom through said longitudinal opening, a second pin-like jaw interconnected to the housing adjacent said one end of the bore and in spaced relation to said first jaw, a power positioning means secured to the housing and including a jaw positioning member extending into the housing through the second end of the bore in abutting relation and releasably coupling with the piston member for positioning thereof within the housing against said resilient means and thereby positioning the first jaw relative to the second jaw for adjustment of the spacing between the jaws and thereby permitting the corresponding spacing of the chain ends.

2. The apparatus of claim 1 wherein said housing has a length of approximately four inches and a diameter of less than one inch.

3. The apparatus of claim 1 wherein said power positioning means includes a nut secured to the housing, and a threaded bolt member threaded through said nut with the inner end moving into said abutting bearing engagement with the piston member.

4. The chain stretcher apparatus of claim 1 wherein said outer housing is formed of a tubular cylinder having said longitudinal opening and being open at the opposite first and second ends, a fixed closure plug in said first end of said tube, said plug and housing having aligned openings, said second pin-like jaw including a pin secured in said aligned openings to form said second pin-like jaw.

5. The chain stretcher of claim 4 wherein said first pin-like jaw is a pin driven into said piston.

6. A chain stretcher apparatus comprising a tubular cylindrical housing having first and second ends and having a longitudinal slot extending throughout a central portion of housing between said ends, said housing having a smooth diameter bore, a cylindrical piston member having a diameter complementing said bore and slidably mounted within said tubular member, said piston member having a solid end wall, a moveable pin-like jaw member secured to the piston member extending outwardly through such slot, a fixed pin-like jaw member secured to the first end of the tube, and a threaded bolt member rotatably threaded within and extending through the second end of the housing and having the inner end coupled to the solid end wall of said piston member for adjustably positioning of the piston member within the housing.

7. The chain stretcher apparatus of claim 6 wherein said first jaw member is a pin having one end secured in an opening in said first pin-like jaw member, and a closure plug located within said first end of the housing, and said plug and housing having aligned openings extending along a diametrical plane, and said second jaw is a pin secured in said openings in said plug and housing.

* * * * *